Figure 2:
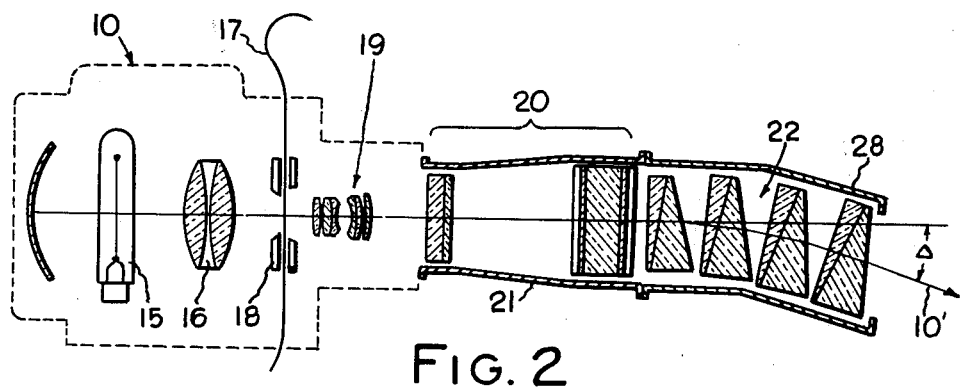

INVENTOR.
NISSON A. FINKELSTEIN
BY
Frank C. Parker
ATTORNEY

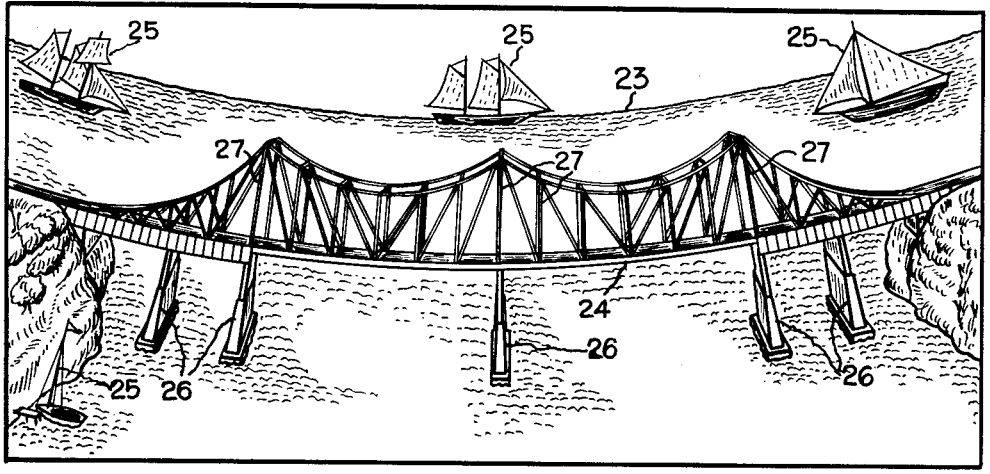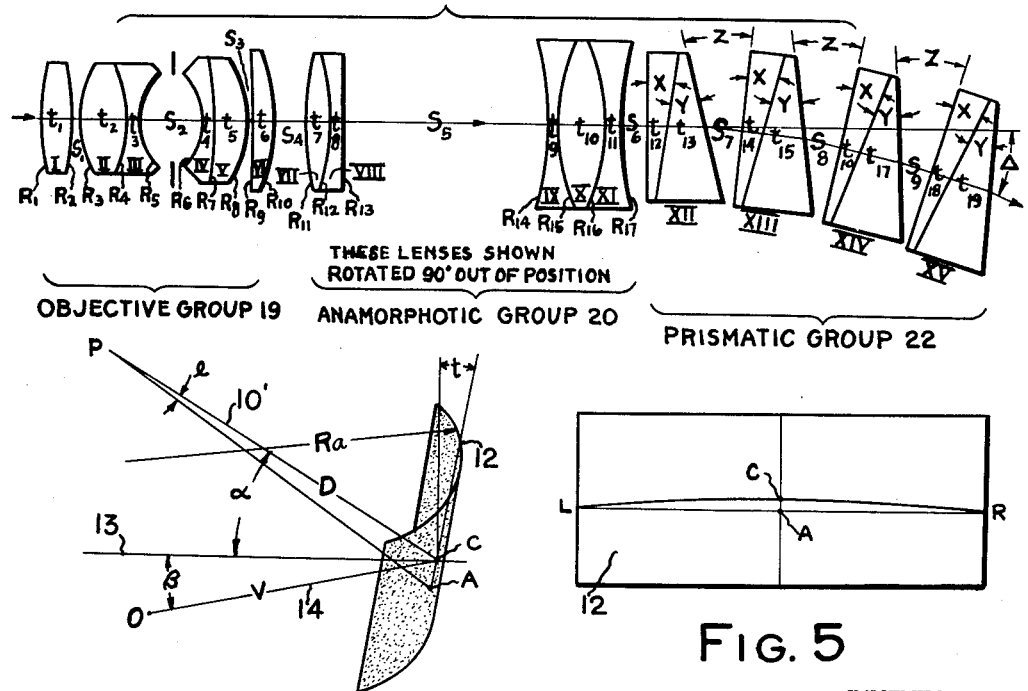

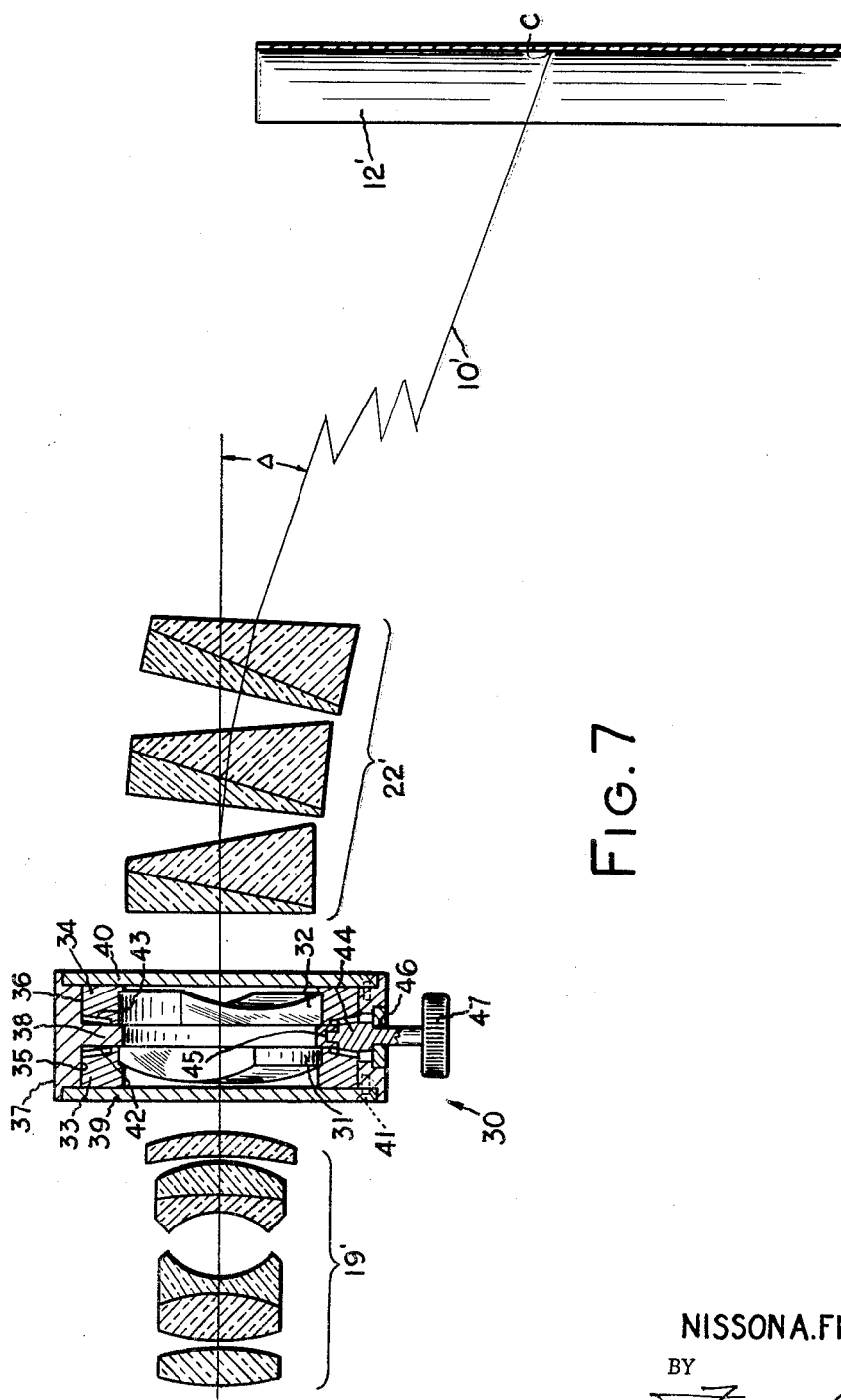

United States Patent Office 3,045,542
Patented July 24, 1962

3,045,542
PROJECTION SYSTEM CORRECTED FOR
MARGINAL DISTORTION
Nisson A. Finkelstein, Penfield, N.Y., assignor to Bausch
& Lomb Incorporated, a corporation of New York
Filed Apr. 22, 1959, Ser. No. 808,135
8 Claims. (Cl. 88—24)

This invention relates to means for projecting an image of a picture film upon a distant screen and more particularly it relates to means for correcting so-called marginal distortion of said image when projected under distortion causing conditions.

In recent years the motion picture industry has introduced apparatus for making and exhibiting the so-called three-dimensional and panoramic pictures. Several different kinds of apparatus have been developed for achieving the three-dimensional and panoramic effects and such apparatus includes various combinations of projection lens construction, screen surface shapes and aspect ratios, and various locations of picture projector with respect to the screen and the observer.

Since the aforesaid apparatus must necessarily be installed in existing theaters having various constructional characteristics, many difficulties arise amongst which is the problem of marginal distortion or so-called "horizon sag" in the projected image. The most noticeable characteristic of the image when such distortion is present, is that the horizon bows downwardly somewhat in the shape of a catenary curve. Often accompanying this distortion is a keystoning effect wherein all erect features in the picture appear to lean inwardly by amounts which increase toward the margin of the image. Several causaitve factors are paramount in this type of image distortion and one or more of such factors may contribute additively in various degrees to produce said marginal distortion, depending on the kind of motion picture apparatus in use and the installation conditions therefor. Among said causative factors is the use of a curved screen whereon the image is displayed and marginal distortion is increasingly noticeable in the image when screen curvatures of short radius are used and also when the wide screens of large aspect ratio are employed. Another factor is the inclination away from horizontal of the projection axis along which the image is projected onto the screen. The steeper the inclination of said axis, the greater is the marginal distortion and the same is true of the inclination of the observer's line of sight or viewing axis.

For practical and economical reasons, theater owners prefer not to change any of the above-mentioned factors in remedying marginal distortion of the projected image which necessitates introducing an optical distortion correcting device into the optical system. Examples of such optical correcting means are to be found in the prior art but certain disadvantages are inherent in each of them such as, costly construction and maintenance, limited use, complication of mechanism, difficulty of application to present apparatus, and other objectionable features.

It is an object of this invention to provide novel optical means for correcting the aforesaid marginal distortion of the projected image which will overcome the disadvantages of the prior art, and be simple and compact in construction, accurate in performance and easily adaptable to existing projection equipment.

It is a further object to provide such a device in the form of prismatic means which will produce a non-linear image aberration which is the same in kind, but opposite in sign, as said marginal distortion whereby said distortion may be fully corrected.

Another object of this invention is to provide by optical means an opposed corrective image aberration of the same kind and degree as the marginal distortion of an image which is projected under distortion causing conditions as above stated, said means comprising a plurality of duplicate prisms which cooperatively produce said corrective aberration, each prism having a small wedge angle and low deviation so as to provide a small portion of said corrective image aberration whereby a selected number of these prisms may be added together to produce a required corrective aberration which is free from errors that are caused by large prism deviations and which compensates for various marginal distortions found in theaters having different projection characteristics.

Another object of this invention is to provide a corrective image aberration in opposition to the marginal distortion in the projected image by prismatic means which are so constructed and arranged with regard to the other optical elements of the projection apparatus that undesirable color effects or secondary spectra in the projected image are greatly reduced and such effects as astigmatism and vertical elongation of the image due to the prism members are all fully compensated or are substantially eliminated.

Further objects and advantages reside in the details of construction of the prismatic device and the combination and arrangement of the parts of the projection system, as particularly pointed out in the specification herebelow and as shown in the accompanying drawings.

Figure 1:
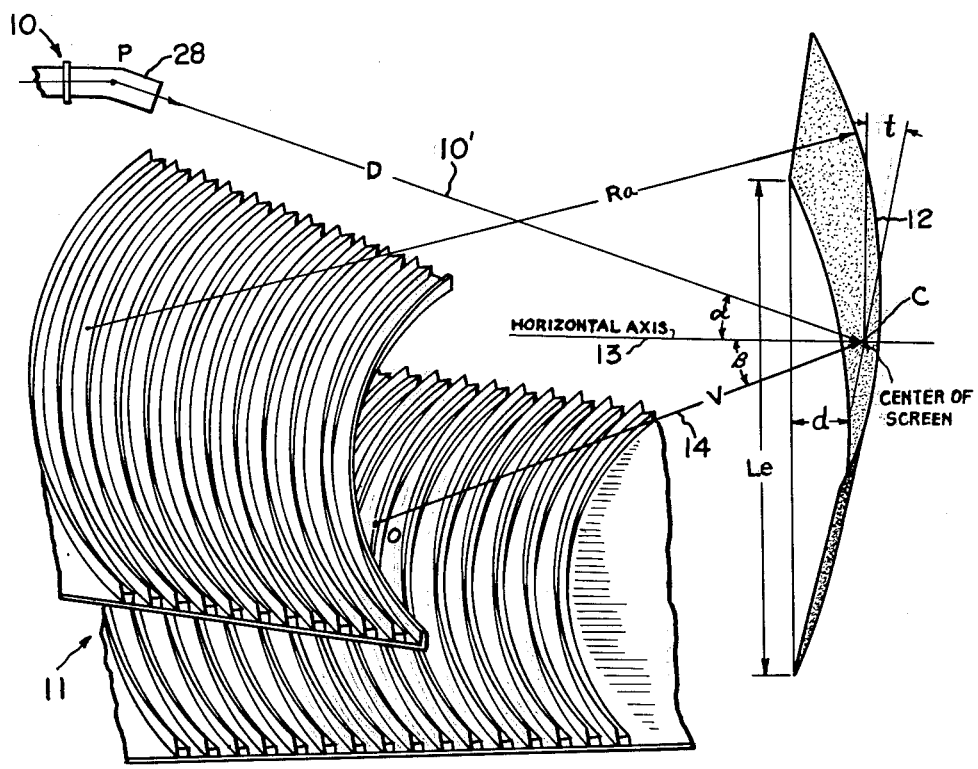

With reference to the drawings:

FIG. 1 is a schematic view of a theater having this invention installed therein, FIG. 2 is a diagrammatic view of the component parts of the projector as used in one form of this invention, FIG. 3 is an exaggerated perspective view of a marine scene as it would appear on the projection screen when aberrated by marginal distortion, FIG. 4 is an optical diagram of one form of construction of the lens and prismatic elements of the optical system used in this invention, FIG. 5 is a diagrammatic view of a curved projection screen used in this invention, FIG. 6 is a diagram which is illustrative of the related marginal distortion parameters which control the shape of the projected image, and FIG. 7 is a somewhat schematic optical diagram showing a modification of the invention illustrated in FIG. 4.

This invention is based on the fact that when an image of a motion picture film is projected upon a curved screen along any projection axis which lies above a normal to the center of the screen, such an image is distorted by what is known as marginal distortion as mentioned hereabove and this effect is increasingly noticeable if wide panoramic screens are used and also if the image is viewed from a position lower than the center of said screen. Furthermore, the aforesaid marginal distortion may be corrected by introducing into the optical system an opposed image aberration of non-linear characteristics which are similar to the distortion, and the instant invention proposes to provide said aberration by prismatic means in combination with the other parts of the projection apparatus, said means being so constructed as to produce a fully corrective aberration for the projected image.

Prismatic means are peculiarly adapted for producing the aforesaid non-linear image aberration by reason of the manner in which a deviation prism refracts an image of a horizontal line lying parallel to the prism base in passing through the prism. Consider, for instance, an optical system such as found in a spectrograph, in which a straight horizontal line parallel to a prism base and intersecting the optical axis of the system in object space is imaged in the image space after passing through the deviation prism. It will be found that after passing the prism the line image is downwardly curved in a non-linear manner from the center thereof outwardly at every point on the line except at its paraxial region and the farther from the center, the more the curvature.

This phenomena is utilized in the present invention to provide a non-linear image aberration in the image that is formed by the projection lens, said aberration being opposed to and substantially equal to the marginal distortion of the image as formed by said lens per se. Moreover, prismatic distortion correctors as herein disclosed are fully effective in counteracting marginal distortion for many combinations of projection apparatus wherein there is a wide range of screen curvatures and aspect ratios as well as a large scope in the size of the projection and viewing angles.

This invention is especially beneficial for curved wide screen theater installations and a detailed description of such an installation is given herebelow.

With reference to FIG. 1 of the drawings, a preferred form of application of the present invention is shown comprising a motion picture projector, generally designated by the numeral 10. Said projector 10 is illustrated in an elevated position above the audience area 11 of a typical theater and is directed so as to project an image (not shown) onto a panoramic or "wide angle" curved screen 12 located in front of the audience area. The distance D from a point P in the projector 10 to the center C of the screen 12 is the length of the projection axis 10' and said axis makes an angle $\alpha$ with a horizontal line 13 drawn thereunder coplanar with said axis through the point C. The angle $\alpha$ is known as the projection angle. Also vertically coplanar with the projection axis is the viewing axis 14 which extends through the distance V between the observer O, seated in the center preferred seats, and the center point C of the screen and lies below horizontal line 13 and makes an angle $\beta$ therewith. The angle $\beta$ is known as the viewing angle.

The screen 12 is formed substantially cylindrically in a horizontal direction having a radius of curvature $Ra$ centered substantially in a vertical plane containing the projection axis and viewing axis. $Le$ denotes the width of the screen and it may have backward tilt "$t$" if desired.

As shown in FIG. 2 of the drawings, the projector 10 comprises the usual light source 15 and condenser 16 for concentrating the light upon a picture film 17. The film 17 having a horizontally compressed image thereon is operatively held in substantially flat condition in a gate mechanism partly illustrated at 18 and is moved in the usual manner by drive mechanism, not shown. An image, not shown, of the picture film 17 is projected upon the screen 12 by a projection objective 19 optically aligned therewith, said objective being more fully described hereinafter.

For the purpose of horizontally expanding the image formed by the objective 19 so that it covers the panoramic screen 12, anamorphotic lens means generally indicated at 20 are provided. This group of lens elements is mounted in optical alignment with the objective 19 within a suitable casing 21 which is supported on the projector housing an any desired manner. A detailed description of the component elements of the anamorphotic lens group 20 is given herebelow.

According to this invention, prismatic means generally indicated at 22 are provided which produce a non-linear image aberration of opposite sense to the marginal distortion, sometimes known as "horizon sag," of the projected image. A detailed description of said prismatic means is given further along in the specification. The effect of said marginal distortion together with the aforementioned keystoning effect is shown pictorially in an exaggerated manner in the picture image shown in FIG. 3. It will be noticed therein that the straight horizontal lines such as the horizon 23 and the bridge floor 24 bow downwardly somewhat like a catenary curve. Because of the keystoning effect, all ordinarily erect features such as the masts 25 of the ships, bridge abutments 26, and structural columns 27, lean toward the center by amounts which increase from a minimum at the center of the picture to a maximum at the margin thereof. Although the "keystoning" effect in the image appears to be reduced by said prismatic means, separate means which are not a part of this invention are usually provided for correcting this effect.

As mentioned in the introductory part of this specification, the marginal distortion is caused by several contributory factors including the size of the projection angle $\alpha$ (see FIGS. 1 and 6) which is the included angle lying in a vertical plane between the projection axis 10' and horizontal line 13 which intersects the center C of the screen 12. Other contributory factors are the viewing angle $\beta$ which lies in said vertical plane between the viewing axis 14 and said horizontal line 13, and additionally in further factors such as the width $Le$ of the screen, the radius of curvature $Ra$ of the screen and the distance D of the projector P from the screen.

A method used for determining the amount of the aforesaid non-linear corrective image aberration required of the prismatic means for eliminating said marginal distortion is here given by reference to FIGS. 5 and 6. FIG. 5 represents a front view of the screen 12 having a center point C where the viewing axis 14 meets the screen when drawn from the observation point O which represents incidentally an average or preferred elevation for all of the seats on that floor of the theater. If a plane is constructed including all points of the viewing axis 14 and perpendicular to the aforesaid vertical plane, such a plane will intersect the screen 12 along the line LCR, which line appears to be curved to an observer at P. By connecting points L and R with a straight line which intersects a vertical line through point C at A, it will be seen that the ends of line LCR bow downwardly by a distance CA which is the amount that a horizontal straight line projected onto the screen must be bent in order to appear straight to the observer at O. Correspondingly, the picture image which is projected onto the screen must be bent downwardly at the sides by the prismatic means 22 to match the line LCR, and the amount of such bending CA (FIG. 6), which represents the amount of the aforesaid corrective image aberration, is represented by quantity "$e$" in the triangle CPA when referred to the projector. A satisfactory approximation of the value of the quantity "$e$" stated in radians may be made by the use of the following formula which takes into account the controlling factors heretofore mentioned, i.e., projection distance, projection angle, viewing angle, curvature of screen, and width of screen using the notation found in FIG. 6, $$e = \frac{1}{8D}(\sin \alpha + \sin \beta) K L e^2$$

in which "$e$" is given in radians, $$K = \frac{1}{R}$$

$Ra$ = radius of curvature of screen in feet,
$D$ = projection distance in feet,
$\alpha$ = projection angle,
$\beta$ = viewing angle,
$Le$ = width of screen in feet.

The quantity "$e$" is independent of the screen tilt "$t$."

The required prismatic power $\Delta$ which yields the required value of the quantity "$e$" may be calculated from the following mathematical expressions, $$\Delta = \frac{8e}{1+\omega} \frac{(D)^2}{(Le)} = \frac{(\sin \alpha + \sin \beta) DK}{1+\omega}$$

where $$\omega = \frac{1}{\Delta}\sum_{i=1}^{n}\frac{\Delta i}{Ni}$$

for a series of $n$ single prisms and the individual prismatic powers $\Delta i$ may be combined additively to equal $\Delta$ as indicated by the mathematical expression $$\Delta = \sum_{i=1}^{n}\Delta i$$

$Ni$ represents the refractive index of the respective prism elements which make up any series of prismatic members such as shown in FIG. 4.

It will be understood that any $\Delta i$ is considered to be positive for any prism positioned with its base down and is considered negative for a prism which is positioned with its base up. Furthermore, a positive value of $\Delta$ means that the rays are bent downwardly and a negative value of $\Delta$ means that the rays are bent upwardly.

If it is required that the prism system be achromatic, then the sum of the ratios of the deviation of the $\nu$ value for each prism element should be zero as given by the expression $$\sum_{i=1}^{n}\frac{\Delta i}{\nu i}=0$$

For such an achromatic prism system, the use of common glasses yields a value of $\omega = 0.76$ approximately. It will be understood from the foregoing description that when the calculated amount of prismatic power $\Delta$ is built into the prismatic means 22, a corrective non-linear type of image aberration is produced thereby which is dependent on all of the above-named factors and substantially corrects all of the margin distortion in the projected image as seen from the vicinity of point O. It should also be understood that the quantity $\Delta$ representing the beam deviation is not necessarily equal to the projection angle $\alpha$. Consequently, when the prismatic means 22 is properly assembled in its casing 28 and secured in optical alignment with the projector, the projector must be aimed to place the projected image in its proper location on the screen 12.

Although a single deviation prism may be constructed to provide the entire computed deviation $\Delta$ of the image rays, there are certain advantages in using a plurality of prisms XII, XIII, XIV, XV (FIG. 4) having a relatively small wedge angle and low deviation, the individual deviations being added together to substantially equal said computed deviation $\Delta$. One advantage of the multi-prism construction is that a variable corrective image aberration may be built up in small increments to provide various total deflections which are required by various theaters having diverse distortion producing characteristics. These small prisms are preferably made in duplicate form to reduce the cost of construction although prisms of unlike deviations may be used additively effectively and these prisms must be either individually or collectively achromatized to remove the color aberrations of the transmitted image. In any case, the plane surfaces on any of these prisms are easier and cheaper to manufacture either as simple or compound achromatic prisms than other optical devices intended for a similar function. By keeping the wedge angle small in the individual prisms, the aspect ratio as well as the overall imagery of the projected image is affected by a minimum amount and it is found that excellent results are achieved by making the individual prism power less than 20 diopters which is the equivalent of the individual deviation angle of about 6 degrees although much larger angles are permissible.

One successful combination of lens and prism elements which produces a well corrected screen image in accordance with this invention in certain CinemaScope motion picture installations having a projection axis that is deflected 23°—44' by the prism system is shown diagrammatically in FIG. 4. Therein the optical elements are divided into the objective group 19, the anamorphotic group 20, and the prism group 22. The elements of the anamorphotic group 20 are rotated 90° out of position for illustration purposes.

A table of constructional data related to FIG. 4 is given herebelow wherein $R_1$ to $R_{17}$ designates the radii of the refractive surfaces, $t_1$ to $t_{19}$ designates the thicknesses of the optical elements, $S_1$ to $S_9$ designates the spacings between the elements, $n_D$ designates the refractive index for the D line of the spectrum for the material used in the optical elements, $\nu$ represents the Abbe number of the material of the optical elements, and $\theta$ and $\theta'$ are the wedge angles of the elements of the achromatic prisms. All refractive curved surfaces which are designated "+" are convex toward the front or incident side of the optical members and the designation "−" means that the surface is concave toward the front.

A small amount of astigmatism is introduced into the projected image by the prism system 22 and this abberration is compensated by adjusting the separation between the negative and positive cylindrical lenses in the anamorphotic lens group 20. It will be understood from the foregoing statement that the anamorphotic group 20 and the prismatic group 22 of optical elements are functionally linked together so that the image defects arising in one group may be corrected by a cooperative structure in the other group. Likewise, the small amount of change in the aspect ratio of the projected image appearing as a slight vertical expansion due to action of the prism system 22 is compensated by designing the relative powers of the negative and positive cylindrical lenses in the anamorphotic lens group 20 so that the horizontal expansion of the image is expanded to restore the proper aspect ratio.

Optical System Constructional Data

[Total deflection of beam "$\Delta$"=23° 44']

| Element | Surface | Thickness | Space | $n_D$ | $\nu$ | Angles |
|---|---|---|---|---|---|---|
| I | $R_1 = +130.1$ | $t_1 = 15.5$ | | 1.6203 | 60.3 | |
| | $R_2 = -156.8$ | | $S_1 = 2.8$ | | | |
| II | $R_3 = +59.12$ | $t_2 = 22.8$ | | 1.611 | 57.2 | |
| | $R_4 = -69.2$ | | | | | |
| III | $R_4 = -69.2$ | $t_3 = 5.5$ | | 1.617 | 38.5 | |
| | $R_5 = +43.98$ | | $S_2 = 31.2$ | | | |
| IV | $R_6 = -32.3$ | $t_4 = 5.5$ | | 1.617 | 38.5 | |
| | $R_7 = -171.0$ | | | | | |
| V | $R_7 = -171.0$ | $t_5 = 17.1$ | | 1.611 | 57.2 | |
| | $R_8 = -50.61$ | | $S_3 = 1.4$ | | | |
| VI | $R_9 = -449.9$ | $t_6 = 11.8$ | | 1.6203 | 60.3 | |
| | $R_{10} = -86.53$ | | $S_4 = 16.0$ | | | |
| VII | $R_{11} = +151.2$ cyl. | $t_7 = 13.4$ | | | | |
| | $R_{12} = -76.92$ cyl. | | | | | |
| VIII | $R_{12} = -76.92$ cyl. | $t_8 = 5.0$ | | | | |
| | $R_{13} = $ Plano | | $S_5 = 100.5$ | | | |
| IX | $R_{14} = -157.04$ cyl. | $t_9 = 5.2$ | | 1.617 | 54.9 | |
| | $R_{15} = +87.64$ cyl. | | | | | |
| X | $R_{15} = +87.64$ cyl. | $t_{10} = 24.1$ | | 1.621 | 36.2 | |
| | $R_{16} = -87.64$ cyl. | | | | | |
| XI | $R_{16} = -87.64$ cyl. | $t_{11} = 5.2$ | | 1.617 | 54.9 | |
| | $R_{17} = +157.04$ cyl | | $S_6 = 6.0$ | | | |
| XII | All refractive surfaces are plano | $t_{12} = 10.0$ | | 1.649 | 33.8 | $\theta = 9°40.4'$ |
| | | $t_{13} = 18.0$ | $S_7 = 18.0$ | 1.517 | 64.5 | $\theta' = 23°13.7'$ |
| | | $t_{14} = 10.0$ | | 1.649 | 33.8 | $\theta = 9°40.4'$ |
| XIII | | $t_{15} = 19.0$ | $S_8 = 18.0$ | 1.517 | 64.5 | $\theta' = 23°13.7'$ |
| | | $t_{16} = 10.0$ | | 1.649 | 33.8 | $\theta = 9°40.4'$ |
| XIV | | $t_{17} = 19.5$ | $S_9 = 18.5$ | 1.517 | 64.5 | $\theta' = 23°13.7'$ |
| | | $t_{18} = 10.0$ | | 1.649 | 33.8 | $\theta = 9°40.4'$ |
| XV | | $t_{19} = 20.5$ | | 1.517 | 64.5 | $\theta' = 23°13.7'$ |

Inter-prism angle $Z = 19°29.2'$.

A modification of this invention is shown in FIG. 7 wherein ordinary motion picture film is used and no horizontal expansion or panoramic effect of the projected image is involved.

This modification comprises the usual illumination and film handling mechanism (not shown) and a projection objective 19' mounted in optical alignment therewith. Similarly to the first form of this invention, a series of deflection prisms 22' is arranged on the projection axis 10' and these prisms have the same construction, arrangement and function as the above-described group of prisms 22 of FIG. 4. The projection axis 10' is deviated by an amount Δ and the projector is so positioned that said axis meets the center C of a curved projection screen 12'.

According to this form of the invention, cylindrical lens means are provided for counteracting the astigmatism of the projected image which is produced by the group of deflection prisms 22'. One effective mechanism designated 30 for removing said astigmatism is shown in FIG. 7 wherein two cylindrical lenses 31 and 32 of opposite sign or refractive power are mounted in optical alignment between the objective 19' and the prism means 22'. The respective opposite powers of the cylindrical lenses 31 and 32 depend upon the total deviation Δ or number of prisms and also depends on the projection distance D, but the refractive curvatures thereof as well as the refractive index and Abbe number are substantially the same so that the net power of said lenses is substantially zero. The positive cylinder lens 31 and the negative cylinder lens 32 are secured in individual lens cells 33 and 34 which are rotatably mounted on their peripheral surfaces 35 and 36 in a ring shaped frame 37. Centrally of the inner space in the frame 37 is formed a radial flange 38 against which the cells 33 and 34 bear on opposite sides thereof. The lens cells 33 and 34 are retained within the frame 37 by a pair of cover plates 39 and 40, respectively, which are secured thereto in any preferred manner such as the screws 41. For rotating the lens cells 33 and 34 in opposite directions simultaneously, the inner faces of said cells are provided with bevel gear teeth 42 and 43, respectively, and a bevel toothed pinion 44 which is rotatably mounted in the frame 37 at 45 and 46, is provided to engage and turn said lens cells by means of a knob 47 fixed thereto. By rotating the knob 47 on the mechanism 30, the astigmatism of the projected image caused by the prismatic means 22' may be removed.

If the prismatic means introduces an objectionable change of aspect ratio in the projected image, an optical anamorphoser of suitable characteristics (not shown) may be introduced to cure the difficulty in the same manner as described hereabove in regard to the preferred form of the invention.

It is believed that this invention provides effective and economical means for correcting marginal distortion in an image which is projected by the apparatus described hereabove, said means being easily adapted to projection equipment which is now in general use in fulfillment of the stated objects of this invention. Although only certain forms of this invention have been shown and described in detail, other forms are possible and changes may be made in the details of construction, combination and arrangement of its parts without departing from the spirit of the invention as defined in the claims here appended.

I claim:

1. Means for projecting a substantially undistorted image of a motion picture film onto a curved screen from a level projector which is located higher than the center of said screen so that said image is substantially free from marginal distortion as seen by an observer located in the preferred seats of a theater, said screen being curved in at least a horizontal direction about a point which is located in a vertical plane medially of the viewing area, means for transilluminating said film, a projection objective aligned on a common horizontal axis with said transilluminating means and film to form an image of said film upon said screen, and prismatic means optically aligned for deviating the projected beam downwardly upon said screen in such a manner as to produce a non-linear correcting aberration for the marginal distortion in said image, said aberration increasing from the midportion outwardly thereof and being opposed to and substantially equal to said marginal distortion, said prismatic means consisting of a plurality of spaced deviation prisms having their entrance faces located substantially radially with respect to the same point therebelow.

2. A picture projection system comprising, in combination, a screen curved horizontally about a point located in a vertical plane medially of the viewing area of said screen to define a concave surface on said screen, projection means for projecting an image from a film onto said concave screen surface, said projection means being disposed with its projection axis in said vertical plane and above said medially disposed point of said screen, said projecting means including means for transilluminating the film and a projection objective aligned on a common horizontal axis with said transilluminating means and film for forming an image of said film on said screen, and prismatic means optically aligned with said objective for correcting marginal distortion of said image and being constructed and arranged to deviate the image rays downwardly sufficiently to produce a non-linear correcting aberration in said image increasing from the midportion outwardly thereof in opposition to and substantially equal to said marginal distortion, said prismatic means consisting of a plurality of spaced deviation prisms having their entrance faces located substantially radially with respect to the same point therebelow.

3. Means for projecting a horizontally expanded image of a motion picture film onto a concave screen from a level projector located higher than the center of said screen and which image is viewed from a position below said screen center so that said image is substantially free from marginal distortion when so viewed, said screen being substantially curved in at least a horizontal direction about a point located in a vertical plane medially of the viewing area of the screen, means for transilluminating said film, a projection objective aligned on a common horizontal axis with said transilluminating means and film to form an image of said film upon said screen, anamorphotic lens means optically aligned with said projection objective to horizontally expand the image formed by the objective on said screen, and prismatic means for correcting marginal distortion of said image, said prismatic means being located adjacent to said anamorphotic lens means and in optical alignment therewith and constructed and arranged relative to said lens means to deviate the image rays downwardly upon said screen and produce thereby a non-linear correcting aberration in said image increasing from the midportion outwardly thereof, said aberration being opposed to and substantially equal to said marginal distortion, said prismatic means consisting of a plurality of spaced deviation prisms having their entrance faces located substantially radially with respect to the same point located therebelow.

4. In a motion picture theater, means for projecting a horizontally expanded image of a motion picture film onto a concave screen from a level projector located higher than the center of the screen and which image is viewed from a position below said center in the preferred seats of the theater so that said image appears to be substantially free from marginal distortion as viewed from said position, said screen being substantially cylindrically curved in a horizontal direction about an axis in front of the screen and located in a vertical plane disposed medially of the viewing area of the screen, means for transilluminating said film, a projection objective aligned on a common horizontal axis with said transilluminating means and film to form an image of said film upon said screen, anamorphotic lens means optically aligned with said objective to horizontally expand the image formed by the objective on said screen, and a plurality of serially arranged deviation prisms located on the projection axis adjacent to said anamorphotic lens means, the entrance faces of said prisms being located substantially radially with respect to the same point therebelow, each of said prisms being constructed to deviate the image rays less than six degrees to thereby cooperatively provide a cumulative nonlinear image aberration of opposite sign to said distortion which substantially eliminates marginal distortion of said image without degrading the image produced by the lens objective.

5. A system for use in a motion picture theater for projecting a horizontally expanded image of a motion picture film onto a concave screen from a level projector which is located higher than the center of said screen so that said image appears to be substantially free from marginal distortion to an observer located in the preferred seats of the theater, said screen being substantially cylindrically curved in a horizontal direction about an axis in front of the screen and which is located in a vertical plane passing medially through the viewing area in front of the screen, means for transilluminating said film, a projection objective aligned on a common horizontal axis with said transilluminating means and film to form an image of said film upon said screen, anamorphotic lens means optically aligned with said objective to horizontally expand said image on said screen, and a plurality of serially arranged deviation prisms located on the axis of projection adjacent to said anamorphotic lens means, each of said prisms being constructed to deviate the projected beam substantially six degrees downwardly and being of achromatic construction so as to provide in cooperation with the other prisms a total deviation of the image rays which thereby produces non-linear correcting aberration substantially equal and opposite in sign to the marginal distortion of said image without degrading the image produced by the objective, said prisms being spaced from each other and each having an entrance face which is located substantially radially with respect to one point therebelow.

6. Motion picture projection apparatus comprising the combination of a panoramic cylindrically curved screen having an axis located in front of the screen and in a vertical plane passing medially through the viewing area in front of said screen, a level projector having an objective which is aligned on a common horizontal axis with the other optical parts of the projector and is positioned higher than said screen for projecting an image from a film onto said screen, anamorphotic lens means located in optical alignment with and adjacent to said objective for horizontally expanding said image to cover the panoramic screen, and prismatic means optically aligned with and adjacent to said anamorphotic means to correct marginal distortion of said image as seen by an observer located lower than the center of the screen, said prismatic means comprising a plurality of spaced deflection prisms serially arranged in optical alignment with said objective and said lens means and having an individual prism power of less than 20 diopters, said prisms each having an entrance face which is located substantially radially with respect to the same point located therebelow, collectively deviating the image rays and thereby producing a cumulative non-linear aberration in the marginal portions of the projected image in opposition to and substantially equal to the uncorrected marginal distortion thereof whereby said distortion is substantially corrected in the image.

7. Motion picture projection apparatus comprising the combination of a panoramic cylindrically curved screen having an axis located in front of the screen and lying in a vertical plane passing medially through the viewing area in front of said screen, a picture projector having a projection objective which is aligned on a common horizontal axis with the other optical parts of the projector and is positioned higher than said screen for projecting an image from a film onto said screen, anamorphotic lens means contiguous to and optically aligned with said objective for horizontally expanding said image to cover the panoramic screen, and a plurality of spaced deflection prisms serially arranged adjacent to the anamorphotic means on the optical projection axis which cooperatively deviate the image rays downwardly and thereby provide a corrective non-linear image aberration in opposition to marginal distortion of said image as seen by an observer located lower than the center of said screen, said prisms having an individual prismatic power of less than 20 diopters and being individually achromatically constructed of at least two parts of glass having an Abbe number difference respectively of between 15 and 70 whereby color aberrations in said image are substantially eliminated, said prisms each having an entrance face which is located substantially radially with respect to the same point therebelow.

8. Prismatic means for correcting the marginal distortion of a projected image according to claim 4, wherein the principal factors which affect the marginal distortion are related approximately to said corrective aberration by the mathematical expression $$e = \frac{1}{8D}(\sin \alpha + \sin \beta)\frac{1}{R}Le^2$$

in which, $e$ = required corrective aberration in radians
$D$ = projection distance in feet
$\alpha$ = projection angle
$\beta$ = viewing angle
$Ra$ = radius of curvature of screen in feet
$Le$ = width of screen in feet.

References Cited in the file of this patent

UNITED STATES PATENTS

| | | |
|---|---|---|
| 1,283,676 | Comstock et al. | Nov. 5, 1918 |
| 1,753,222 | Timoney | Apr. 8, 1930 |
| 1,952,522 | Warmisham | Mar. 27, 1934 |
| 2,780,140 | Luboshez | Feb. 5, 1957 |
| 2,792,746 | O'Brien | May 21, 1957 |
| 2,795,996 | Sauer | June 18, 1957 |
| 2,828,670 | Luboshez | Apr. 1, 1958 |
| 2,890,622 | Wallin | June 16, 1959 |

FOREIGN PATENTS

| | | |
|---|---|---|
| 1,145,367 | France | May 6, 1957 |
| 548,587 | Germany | Apr. 16, 1932 |